United States Patent
White et al.

(10) Patent No.: US 9,797,795 B2
(45) Date of Patent: Oct. 24, 2017

(54) DISTRIBUTED PRESSURE MEASUREMENT BY EMBEDDED FIBER OPTIC STRAIN SENSOR

(71) Applicant: Intuitive Surgical Operations, Inc., Sunnyvale, CA (US)

(72) Inventors: Matthew M. White, Glen Mills, PA (US); Eric E. Sanborn, Blacksburg, VA (US); Matthew A. Castellucci, Blacksburg, VA (US); Emily E. H. Templeton, Blacksburg, VA (US); Naman Garg, Blacksburg, VA (US); Nur Aida Abdul Rahim, Blacksburg, VA (US); John J. Kutz, Blacksburg, VA (US); Alexander K. Sang, Christiansburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 383 days.

(21) Appl. No.: 14/524,114

(22) Filed: Oct. 27, 2014

(65) Prior Publication Data
US 2015/0114130 A1 Apr. 30, 2015

Related U.S. Application Data

(60) Provisional application No. 61/896,916, filed on Oct. 29, 2013.

(51) Int. Cl.
*G01L 1/24* (2006.01)
*G01L 9/00* (2006.01)
*G01P 15/08* (2006.01)
*G01L 11/02* (2006.01)

(52) U.S. Cl.
CPC ............. *G01L 11/025* (2013.01); *G01L 1/246* (2013.01)

(58) Field of Classification Search
None
See application file for complete search history.

(56) References Cited

U.S. PATENT DOCUMENTS

| | | | | |
|---|---|---|---|---|
| 5,193,129 A | * | 3/1993 | Kramer | ................... G01L 1/245 250/227.14 |
| 5,253,310 A | * | 10/1993 | Delbare | ............... G02B 6/3839 385/14 |
| 5,293,039 A | | 3/1994 | Mongiols | |
| 5,798,521 A | | 8/1998 | Froggatt | |

(Continued)

*Primary Examiner* — Peter Macchiarolo
*Assistant Examiner* — Jermaine Jenkins
(74) *Attorney, Agent, or Firm* — Nixon & Vanderhye P.C.

(57) ABSTRACT

A pressure sensing pad includes a flexible planar layer having a two-dimensional sensing area, and an optical fiber embedded in the plane of the flexible planar layer traversing the two-dimensional sensing area in a particular configuration. At least one end of the fiber optic strain sensor has a connector that is connectable to an interferometric-based fiber optic interrogation and processing system. When the connector is connected to the an interferometric-based fiber optic interrogation and processing system and pressure is applied to the pressure sensing pad, a signal from the optical fiber is provided to and processed by the interferometric-based fiber optic interrogation and processing system to determine a two-dimensional pressure map for the two-dimensional sensing area.

18 Claims, 4 Drawing Sheets

(56) References Cited

U.S. PATENT DOCUMENTS

| | | | | |
|---|---|---|---|---|
| 5,913,245 | A | * | 6/1999 | Grossman .............. G01L 1/245 250/227.14 |
| 6,545,760 | B1 | | 4/2003 | Froggatt et al. |
| 6,687,424 | B1 | * | 2/2004 | Gerdt ................ A61B 5/02416 385/12 |
| 6,788,417 | B1 | * | 9/2004 | Zumberge ............. G01H 9/004 356/477 |
| 7,825,814 | B2 | * | 11/2010 | Lokhorst ................ A61B 5/11 340/573.1 |

\* cited by examiner

DISTRIBUTED PRESSURE MEASUREMENT BY EMBEDDED FIBER OPTIC STRAIN SENSOR

PRIORITY APPLICATION

This application claims priority from U.S. provisional application Ser. No. 61/896,916, filed on Oct. 29, 2013, the contents of which are incorporated herein by reference.

TECHNICAL FIELD.

The technology in this application relates to optical measurement apparatus and techniques.

BACKGROUND AND SUMMARY

Many mechanical testing applications require a load distribution to be measured over a physical area. In such applications, it is often necessary to also know the pressure distribution induced by that load over that particular area. The inventors recognized that there is a relationship between pressure distribution and applied strain. Measurements of strain may be used to gain insight into the behavior of mechanical structures under applied loads. One way to do this is to attach a resistive strain gage at a location of interest and interpret the response of the gage. However, this only results in a single point measurement. In order to comprehensively map out the strain response over an area of a structure, it is necessary to install multiple independent resistive strain gages. This effort can be highly time consuming and tedious. Due to the surface area covered by individual resistive strain gages, there is a limited and finite measurement density that can reasonably be achieved. Furthermore, installing a finite number of individual sensors may affect the load distribution and does not provide a homogeneous contact surface. Thus when an application requires a measure of strain over an area of a structure, an array of resistive strain gages is not ideal.

U.S. Pat. No. 5,293,039 describes a pressure sensor in which an optical fiber is sandwiched between several layers to form a sensing pad. In this method, each individual fiber provides only a single pressure measurement. This is an intensity based system and returns a single measurement dependent upon the amount of bend loss that occurs throughout the length of the fiber when a pressure is applied. This method requires that the fiber be woven through a layer of the structure, which is difficult to manufacture. Furthermore, several layers are required, which increases the thickness of the structure and complicates it, further reducing the ability of an external response to couple into the sensing fiber.

The inventors recognized that distributed interferometric fiber optic strain sensing may be utilized to provide a high density strain map of a particular area, and from that strain map, determine a corresponding pressure distribution. Interferometric fiber optic sensing uses an optical fiber as a sensor. A tunable laser source sends light down the fiber and detectors measure the Rayleigh backscatter from the optical fiber. Strain along the fiber axis stretches the spatial frequency of the backscattered light, resulting in a shift of the frequency spectrum reflected from each portion of the fiber. Each scan of the laser interrogates the entire length of sensing fiber, resulting in measurements with micron level spatial resolution. Traditional fiber optic strain sensing provides a one dimensional measurement of strain along the length of the fiber sensor. A map of a two or three dimensional strain field is achieved by a series of fiber passes through the test structure.

Example embodiments include a pressure sensing pad with a flexible planar layer having a two-dimensional pressure sensing area. An optical fiber is attached to and traverses the pressure sensing area of the flexible planar layer. At least one end of the fiber optic strain sensor has a connector configured for connection to an interferometric-based fiber optic interrogation and processing system.

When the connector is connected to the an interferometric-based fiber optic interrogation and processing system and pressure is applied to the pressure sensing pad, a signal from the optical fiber is provided to and processed by the interferometric-based fiber optic interrogation and processing system to determine a two-dimensional pressure map for the two-dimensional sensing area.

Example embodiments also include a system for measuring pressure. A pressure sensing pad includes a layer with a two-dimensional pressure sensing area and an optical fiber attached to and traversing the pressure sensing area of the flexible planar layer the two-dimensional sensing area in a particular configuration. An interferometric-based fiber optic interrogation and processing system is coupled to one end of the optical fiber and is configured, when pressure is applied to the pressure sensing pad, to detect and process reflected light from the fiber optic strain sensor to determine a pressure associated with the two-dimensional sensing area.

In one example implementation, the pressure may be a two-dimensional pressure map. The optical fiber may be configured to be interrogated by the interferometric-based fiber optic interrogation and processing system to provide strain information at multiple different points along the length of the optical fiber which is convertible by the interferometric-based fiber optic interrogation and processing system to the two-dimensional pressure map.

In another example implementation, the optical fiber is a distributed optic strain sensor configured to provide strain information at multiple different points along the length of the optical fiber.

In another example implementation, a particular configuration of the fiber includes at least a serpentine portion.

In another example implementation, a material of the flexible planar layer has a desired elastic modulus range.

In another example implementation, a material of the flexible planar layer reduces friction.

In another example implementation, a surface of the flexible planar layer includes a coating applied thereto that reduces friction.

In another example implementation, a bend sensing pad is formed by including the optical fiber in the pressure sensing pad offset from a central plane of the pressure sensing pad.

In another example implementation, the optical fiber is embedded within a monolithic sheet of epoxy.

Some of the advantages of this technology are that an individual fiber provides a large number of distributed pressure measurements along the fiber that does not depend upon the amount of bend loss that occurs throughout the fiber when a pressure is applied. The fiber does not need to be woven through a layer of the pad. Only a single layer or sheet is needed, thereby providing a thin, flexible, simple, and cost effective structure. The configuration of the single fiber embedded in layer or sheet permits mapping of a two (or three) dimensional strain field.

DETAILED DESCRIPTION

A pressure sensing pad may be constructed by embedding the optical fiber within an elastic layer or sheet made of a suitable base material examples of which are described below. The position of the optical fiber is located in a two dimensional plane within the elastic layer or sheet before or after embedding. The pressure pad is connectable to an interferometrically-based optical sensing and processing system. An interferometric optical sensing and processing system allows determination of optical properties of light over a length of optical fiber. As an example, one can obtain a measure of scattering amplitude along the length of a sensing fiber. By comparing the changes in the scattering profile from a fiber under stain to a measurement of the fiber in an unstrained state, a measure of strain applied along the length of the sensing fiber may be obtained as described in U.S. Pat. No. 6,545,760, incorporated herein by reference. When the pressure pad is connected to a distributed fiber optic strain sensing interrogator, a measure of strain over a given area of the pressure sensing pad is obtained. The resulting strain field is then converted to a measure of pressure over this area.

Figure 1:
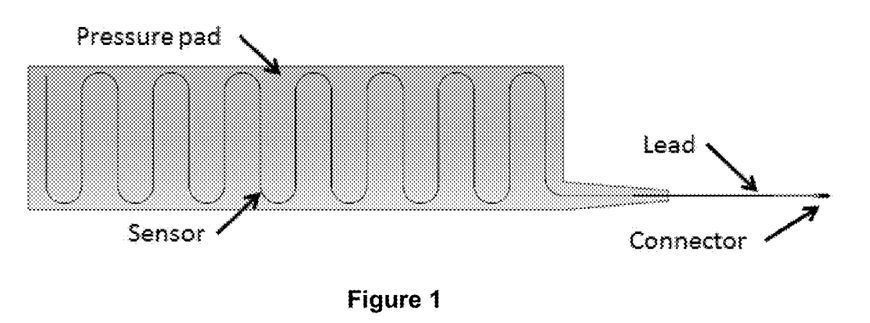
FIG. 1 shows an example embodiment of a distributed pressure pad having an optical fiber embedded in an elastic material.

FIG. 1 shows an example embodiment of a distributed pressure pad having an optical fiber embedded in an elastic material. The pressure pad generally takes the form of a thin elastic layer or sheet with a fiber optic strain sensor embedded in the plane of the layer or sheet. A lead with a connector extends from the pad to the interferometrically-based sensing and processing system. At the other end of the sensor, an end termination is embedded within the pad. Alternately, this end could also have a lead with connector extending from the pad. The sensor can be embedded in the layer or sheet in accordance with any suitable configuration, shape, orientation, or way depending on application requirements. In the example embodiment of FIG. 1, the optical fiber has a serpentine configuration.

Figure 2:
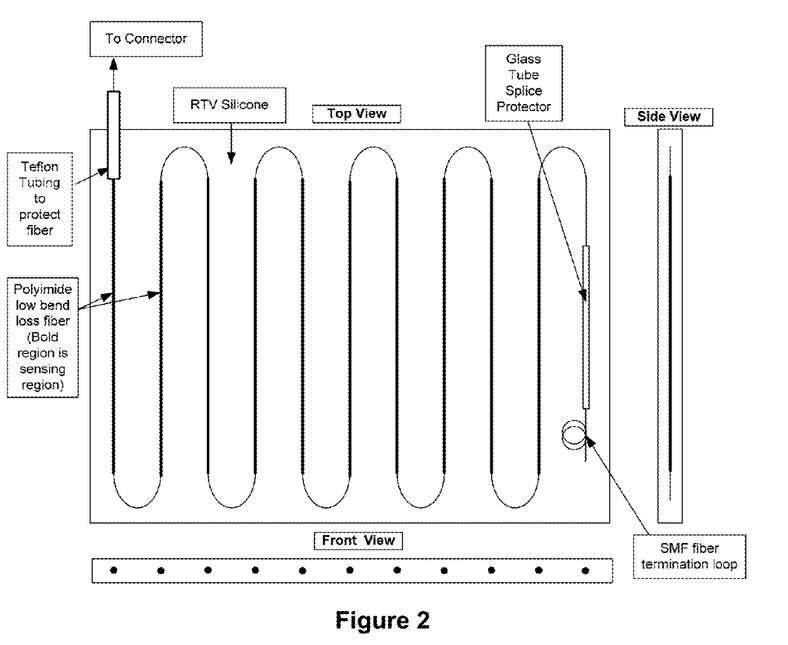
FIG. 2 shows top, front, and side views of an example optical fiber pressure sensing pad similar to that shown in FIG. 1.

FIG. 2 shows top, front, and side views of an example optical fiber pressure sensing pad similar to that shown in FIG. 1. The fiber end having a connector may also include a protective tubing, e.g., made of Teflon, and the other end of, which may terminate with one or more loops, may also include a protective tubing, e.g., a glass tube splice protector. The fiber in this example may be a polyimide low bend loss fiber. The depicted bold, thicker portions of the fiber correspond to example sensing regions and the curved portions of regular line thickness are not used as sensing regions in this example.

When a compressive load is applied to the pad it deforms an amount proportional to its compressive modulus or stiffness. A material under compression in one direction (axial) tends to expand in the other two perpendicular directions (transverse), a phenomenon called the Poisson effect. When the pressure pad is loaded, it becomes slightly thinner while also increasing in length and width. A material property called the Poisson's ratio relates the axial and transverse strain for that material. The transverse strains, called Poisson strains, while small, are measurable by the fiber optic strain sensor. A fiber optic strain sensor is highly sensitive to changes in length of the sensor, which is used to derive the strain along the sensor. When embedded within the pressure pad, the fiber optic strain sensor is measuring the Poisson strain of the pad material due to the increase in length or width of the pad based on the orientation of the fiber to these respective changes in length. Given the elastic modulus of the material, its Poisson's ratio, and loading level, the Poisson strain can be estimated.

Figure 3:
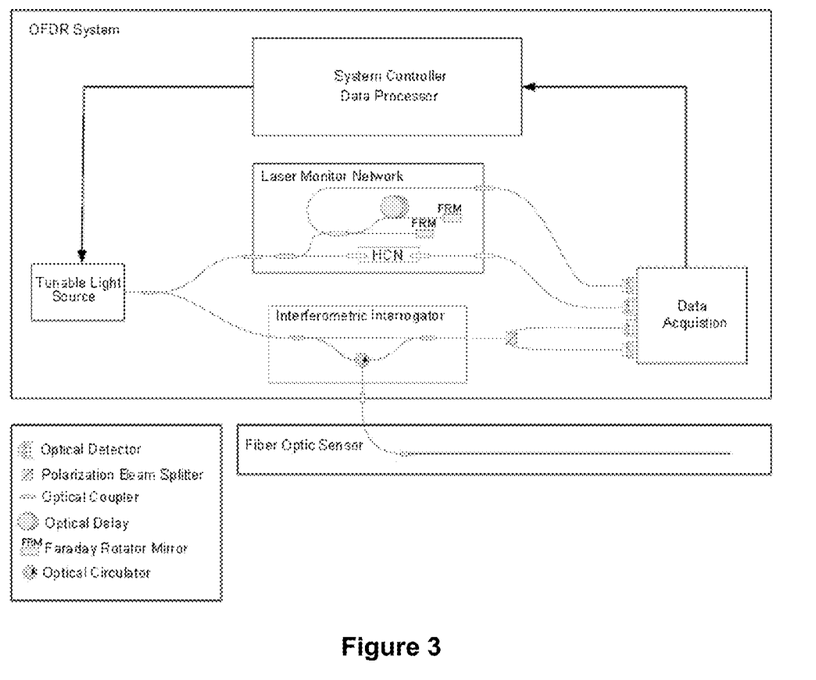
FIG. 3 illustrates an example OFDR system which when coupled to the pressure sensing pad provides a system for measuring pressure.

In an example embodiment, the interferometrically-based sensing and processing system coupled to the embedded sensor of the pressure sensing pad is an Optical Frequency Domain Reflectometry (OFDR) system. Together the pressure sensing pad and the OFDR system form a pressure sensing system. An example OFDR system is shown in FIG. 3 where light from a tunable laser source, which has a frequency scan rate, is launched into an interferometric interrogator, in which the incoming light is further split into two paths. The upper path is a reference path, and in the lower path, the light passes through a circulator before entering the sensing fiber. The sensing fiber corresponds to the optical fiber shown in FIGS. 1 and 2.

Along the length of the sensing fiber, small fractions of the incident light are reflected, either as a result of Rayleigh scattering or at distributed fiber Bragg gratings (FBGs) or discrete reflectors. The reflected light propagates back down the sensing fiber, through the circulator, and is recombined with the incident light from the reference path at a fiber optic coupler where the scattered light along the length of the sensing fiber interferes with light that has traveled along the reference path of the interferometric interrogator. A polarization beamsplitter (PBS) splits the light into two orthogonal polarization states, and the split interference pattern is detected independently at S and P photodetectors.

A second interferometer within a laser monitor network measures fluctuations in the tuning rate as the light source 30 scans through a frequency range. The laser monitor network also contains a Hydrogen Cyanide (HCN) gas cell which is used to provide absolute wavelength reference throughout the measurement scan.

A series of optical detectors converts the detected light signals from the laser monitor network, gas cell HCN, and the interference pattern from the sensing fiber into electrical signals for a data acquisition unit. A system controller data processor uses the acquired electrical signals from the data acquisition unit to extract a scattering profile along the length of the fiber sensor. More specifically, by applying a Fourier Transform, the frequency-domain OFDR data is converted into a complex-valued signal representing optical backscatter at finely-spaced delay intervals (e.g., equivalent to approximately 50 μm physical length per point) along the length of the fiber. A phase-based measurement of distributed strain is made for the sensing fiber to determine the distribution of scattered light along the length of the fiber. As mentioned above, this spatially-distributed backscatter can be generated either through Rayleigh scatter or from discrete or continuously-written FBGs. A preferred, example embodiment uses the fiber's Rayleigh scatter signature for OFDR-based sensing.

If a strain is imparted on the optical fiber, its Rayleigh scatter signature or FBG peak will shift in frequency. This frequency shift is linearly proportional to the applied strain. The applied strain results in a spectral shift in the OFDR signal which varies as function of delay. After converting to the delay domain, the spatially-varying frequency shift results in a phase slope which varies as a function of delay. The phase of the delay-domain OFDR signal is used to measure strain along the length of the optical fiber. This calculation is performed by comparing the fiber in a strained "measurement" state with OFDR data obtained from a "reference" state.

Distributed fiber optic strain sensing is used to measure strain imparted on a structure by affixing the optical fiber to that structure. As the structure changes in physical dimension, the length of the optical fiber changes in length based on its orientation to that change in physical dimension. Hence, the distributed strain measurement of the fiber can be orientated to the structure to determine a distributed measure of strain experienced by the structure. Similar to attaching an optical fiber to the surface of a structure, the optical fiber can be embedded in the structure to monitor the change in dimensions of that structure. By selecting a flexible material for embedding the optical fiber, a distributed fiber optic strain sensing pad can be constructed.

To construct a flexible pressure sensing pad, in one example embodiment, the material of the elastic layer or sheet is selected based on one or more of elastic modulus of the material, its Poisson's ratio, and/or an applied loading level. An example material selection process for a pressure pad capable of operating under applied loads up to 3.45 MPa (500 psi) is now described for illustration purposes only. Initially, a range of elastic modulus is determined that would result in a Poisson strain within a desired range given the maximum expected loading level of 3.45 MPa (500 psi).

Under compression, the pressure pad acts as an axial element through its thickness. The deflection δ of an axial element under load is:

$$\delta = \frac{FL_0}{EA_0}$$

Substituting pressure (p)*area ($A_0$) for force (F) and simplifying yields the deflection δ (change in thickness) in terms of applied pressure, length ($L_0$) (thickness), and elastic modulus (E):

$$\delta = \frac{FL_0}{EA_0} = \frac{pA_0L_0}{EA_0} = \frac{pL_0}{E}$$

Using the previous relationship, strain on the axial element can be expressed in terms of applied pressure and elastic modulus:

$$\varepsilon = \frac{\delta}{L} = \frac{\frac{pL_0}{E}}{L} = \frac{p}{E}$$

When the fiber optic sensor is placed within a plane in the pressure pad, measured strain (ε) is perpendicular to the applied load (pressure (p)). Under compression, the pad material expands outward in an amount determined by the Poisson's ratio of the material:

$$\varepsilon_{compression} = \frac{p}{E} \qquad \varepsilon_{fiber} = \upsilon \varepsilon_{compression}$$

Using these relationships and the upper limit load of 3.45 MPa (500 psi), the effect of a material's elastic modulus on the measurable strain can be determined. These calculations assume that the test environment is frictionless and the pressure pad is free to expand and contract as its material properties dictate.

Figure 4:
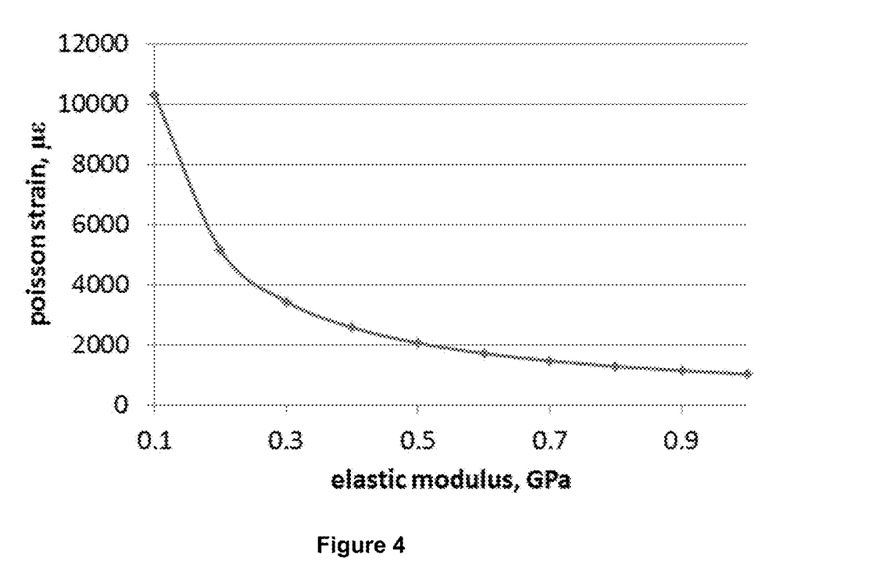
FIG. 4 shows a graph of Poisson strain versus elastic modulus for an example pressure pad.

Elastic modulus of the pressure pad material is an important parameter because it preferably should fall within a fairly narrow range to provide more accurate measurements. FIG. 4 shows a graph of Poisson strain versus elastic modulus for an example pressure pad. More specifically, FIG. 4 shows an example elastic modulus range for a 3.45 MPa (500 psi) pressure pad of 0.1 to 1.0 GPa (14.5 to 145 ksi). This example range is advantageous because the Poisson strain will be between 1000 and 10,000 microstrain which is within the measurement range of conventional distributed fiber optic based strain sensing systems.

In example testing of an example pressure sensor pad, a Poisson's ratio of 0.3 was used. Poisson's ratio is much less of a variable for engineering materials than modulus. Many engineering polymers and metals used within their design limits have a Poisson's ratio near 0.3, while modulus can vary in a much wider range.

Materials outside a desired range of elastic modulus provide less accurate measurements. Consider aluminum with an elastic modulus 68.9 GPa (9993 ksi). At a load of 3.45 MPa (500 psi), the Poisson strain is only 16 microstrain, which is just above the noise floor. As a result, the OFDR may not able to detect and distinguish smaller loading levels. Similarly, materials having lower stiffness (e.g., lower than 0.1 GPa or 14.5 ksi in this example) can result in too much strain to reliably measure.

Another important parameter for the pressure pad material is compression strength. This material parameter indicates how much a material can be loaded before it yields, or takes on a permanent, non-elastic deformation. For example, selecting a material with yield strength higher (e.g., several times higher) than a maximum expected loading level can help ensure a repeatable strain response over multiple load cycles. Given these parameters a material may be identified that meets the criteria for a given application. Example materials include polymer sheets, liquid resins, etc.

Figure 5:
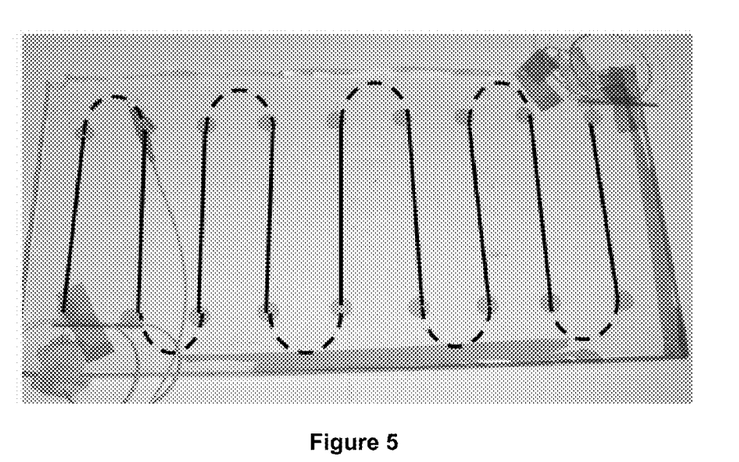
FIG. 5 shows an example epoxy pressure pad with a serpentine fiber optic sensor configuration.

FIG. 5 shows an example epoxy pressure pad with a serpentine fiber optic sensor configuration. Active sensor regions are shown as solid lines, and dashed lines indicate turn-around regions.

The pressure pad layer or sheet may be constructed using a variety of methods including, but not limited to laminating between sheets, casting, or bonding using an adhesive. As an example, the construction process of a cast epoxy pressure pad with embedded fiber optic sensor is described below, as a non-limiting, example embodiment.

The epoxy pressure pad was constructed by casting and curing one layer of epoxy, positioning the fiber optic sensor on its surface, then casting and curing a second epoxy layer of epoxy. This resulted in the fiber optic sensor embedded within a monolithic sheet of epoxy. Epoxy used has low mixed viscosity so it will self-level before gel and cure. Vacuum mixing and degassing were utilized to minimize trapped air bubbles within the epoxy. By using a leveled mold surface and carefully controlling the volume of mixed epoxy resin, the position of the sensor within the pressure pad may be controlled.

Another advantageous feature of the pressure sensor pad is that the fiber optic sensor measures strain at each point along the length of the sensor. This high resolution of sensor data points permits the OFDR system to generate a strain map for the sensing area of the pad which can be converted to a pressure map for the area. However, it is important that sensor data points be mapped to locations on the pressure pad in order to provide meaningful measurement results. This can be achieved by applying localized strains to the pressure sensing pad and monitoring the distributed strain response of the optical fiber. If a local change in strain applied to the surface of the pad is detected at a distance along the length of the sensing fiber, it is known that future detected strains at that distance along the length of the sensor corresponds to that physical location on the pressure pad surface. While turn-around regions between sensing regions can be used to determine deformation of the pad, one must consider the changing orientation of the optical fiber to the deformation direction of the sensing pad. A fiber optic strain sensor detects changes in length of the pressure sensing pad that occur in the orientation of the central axis of the fiber.

One example technique for identifying active sensor regions is to apply a localized cold temperature to the sensor at a known location on the pad. This causes a measurable spike in the strain signal due to the compression of the pad material of which the fiber is embedded. This strain signal will reveal the location along the sensor length that corresponds to that physical position on the pad. This method is repeated to identify each point of each sensor region. This technique may also be applied directly to the fiber, e.g., some time between a first and second molding process during construction of the pressure pad.

Testing of an example pressure senor pad using an MTS hydraulic load frame using standard compression platens. In order to concentrate the applied pressure within active sensing regions. A 50 mm (2 in) wide solid aluminum bar was used between the upper compression platen and the pressure pad. In each test, loading was increased in 345 kPa (50 psi) increments, up to a maximum loading level of 3.45 MPa (500 psi), then decreased in 345 kPa (50 psi) increments. Friction between the pressure pad surface and the loading element can result in hysteresis by restricting free expansion and contraction of the pressure pad. In addition, the Poisson strain calculation assumes a frictionless pressure pad surface.

In order to reduce friction and hysteresis, two sheets of Teflon-coated fiberglass may be placed on each side of the pressure pad. In between the two sheets, grease or other lubricant may be applied to minimize friction restricting the expansion and contraction of the pressure pad. In these example embodiments, two Teflon-coated fiberglass sheets sealed along their edges prevent grease from coming in contact with the assembly. Teflon-coated fiberglass sheets are an example. Other materials with similar properties may be used.

Figure 6:
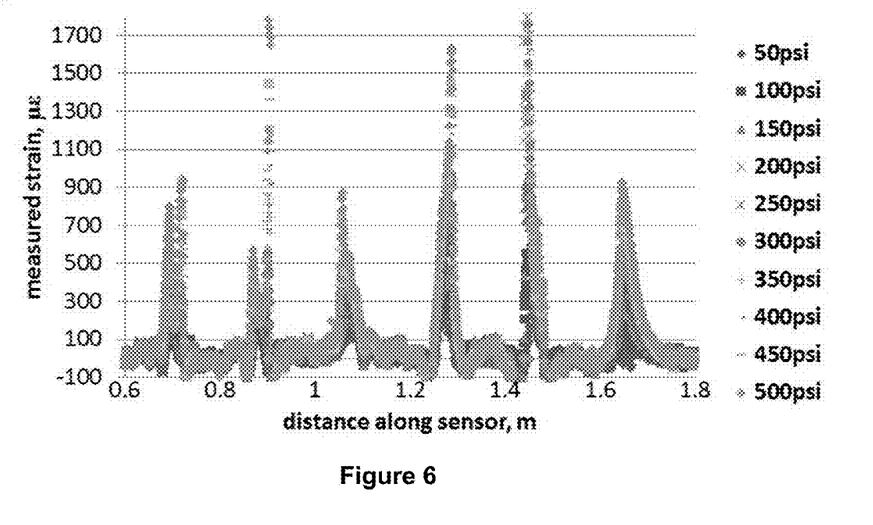
FIG. 6 shows an example of a spatial distributed strain measurement of the tested example pressure sensor with six sensing regions under load.

FIG. 6 shows an example of a spatial distributed strain measurement of the tested example pressure sensor with six sensing regions under load being clearly indicated. The higher strain peaks are likely due to small differences in pad thickness. The peak observed strain level was ~3500µε.

Figure 7:
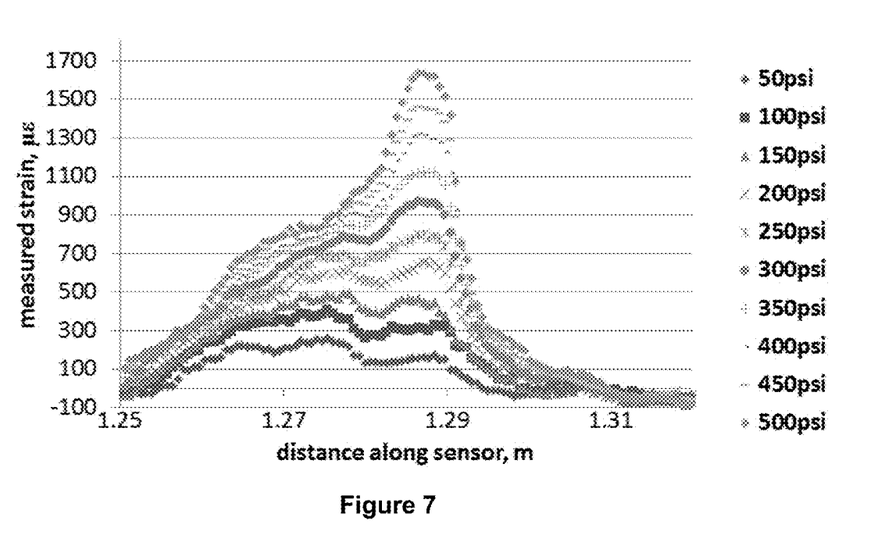
FIG. 7 show example distributed strain measurement profiles within a single sensing region.

FIG. 7 shows example distributed strain measurement profiles within a single sensing region. A distributed strain measurement profile is shown in sensing region #4 as load is applied. The X axis scale represents 70 mm (2.76 in) length of the fiber sensor (1.25 m to 1.32 m).

The pressure pad material may be tailored to different applications. Selecting a material based on its compression modulus and its strength are helpful parameters to initially consider. Other concerns, such as linearity and manufacturability, are also helpful to consider. Example materials include polymer sheets, liquid resins, etc. For example, the strain sensor may be positioned on a pre-cured sheet and bonded in a laminate to another sheet to form a pressure pad. Alternately, the sensor may be bonded in a machined groove on one or more surfaces of a sheet.

Sensor location and routing within the pad may be optimized for a given application. In the example embodiments described above, the sensor is configured in a serpentine pattern and located along the midplane of the pressure pad. This configuration avoids measuring bending strain by placing the sensor along a neutral axis of the pad. By placing the sensor off-axis and closer to one surface of the pad, and by including a complementary sensor an equal distance off-axis near the other surface, a bending strain may be measured and accounted for by comparing the relative measurements. Due to the flexible nature of the pad, a distributed bend sensor may be constructed.

In examples given above, the fiber sensor was configured in a serpentine pattern with active sensor regions oriented parallel to one another and with equidistant spacing. Depending on application requirements, variable spacing (sensor density) and additional sensor elements with perpendicular orientations may be employed to improve measurement resolution. If the pad has sufficient thickness, then the fiber can be orientated parallel to the applied load for a more direct (not based on Poisson strain, but measuring compression strain directly) measurement of compression.

Other types of fiber optic sensors may be used to augment the strain measurement. For example, fiber optic temperature sensors may be used to provide thermal compensation ability and/or fiber optic shape sensors may be used to extract bending information.

Because the pressure pad is sensitive to friction between its surfaces and loading elements in some applications, another embodiment of the pressure pad includes one or more mechanisms to reduce frictional load transfer as a shear force acting on the pad such as but not limited to coatings, films, lubricants, or any combination applied to the surface of the pad.

For many applications, pressure measurement is sensitive to variation in pad thickness. In such applications, the pad thickness is preferably controlled to be within appropriate tolerances using a variety of methods such as but not limited to accurate casting, post-machining, etc.

The pressure pad with embedded optical fiber described above may be used to provide distributed pressure data. The optical fiber is interrogated using an interferometric-based distributed strain sensing technique to provide strain information along the length of the optical fiber. Embedding the optical fiber in a known two dimensional configuration allows the interferometric-based distributed strain sensing system to provide a two dimensional strain map over the sensing area of the pad rather than simply a one dimensional strain along the length of the fiber. This strain map measurement is then converted to provide a pressure map. The material in which the sensor is embedded can vary to fit the needs of the application. With modifications to thickness, embedding material, and fiber path, an embedded fiber optic pressure sensor can measure reasonable differential pressure readings across a wide range of applications and load levels.

The above description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices have been omitted so as not obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as solid-state memory, magnetic disk, or optical disk containing an appropriate set of computer instructions that would cause a processor to carry out the techniques described herein.

Although the description above contains many specifics, those specifics should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A pressure sensing pad comprising:
   a flexible planar layer having a two-dimensional pressure sensing area; and
   an optical fiber attached to and traversing the pressure sensing area of the flexible planar layer,
   wherein at least one end of the optical fiber has a connector configured for connection to an interferometric-based fiber optic interrogation and processing system, and
   wherein the optical fiber is a distributed optic strain sensor configured to provide strain information at multiple different points along a length of the optical fiber.

2. The pressure sensing pad in claim 1, wherein when the connector is connected to an interferometric-based fiber optic interrogation and processing system and pressure is applied to the pressure sensing pad, a signal from the optical fiber is provided to and processed by the interferometric-based fiber optic interrogation and processing system to determine a two-dimensional pressure map for the two-dimensional pressure sensing area.

3. The pressure sensing pad in claim 1, wherein the optical fiber is configured to be interrogated by the interferometric-based fiber optic interrogation and processing system to provide strain information at multiple different points along the length of the optical fiber, the strain information convertible by the interferometric-based fiber optic interrogation and processing system to a two-dimensional pressure map for the two-dimensional pressure sensing area.

4. The pressure sensing pad in claim 1, wherein a particular configuration of the optical fiber includes at least a serpentine portion.

5. The pressure sensing pad in claim 1, wherein a material of the flexible planar layer has a desired elastic modulus range.

6. The pressure sensing pad in claim 1, wherein a material of the flexible planar layer reduces friction.

7. The pressure sensing pad in claim 1, wherein a surface of the flexible planar layer includes a coating applied thereto that reduces friction.

8. The pressure sensing pad in claim 1, wherein the optical fiber is embedded within a monolithic sheet of epoxy.

9. A pressure sensing pad comprising:
   a flexible planar layer having a two-dimensional pressure sensing area; and
   an optical fiber attached to and traversing the pressure sensing area of the flexible planar layer,
   wherein at least one end of the optical fiber has a connector configured for connection to an interferometric-based fiber optic interrogation and processing system, and
   wherein the pressure sensing pad is configured to measure bending strain by including the optical fiber in the pressure sensing pad offset from a central plane of the pressure sensing pad.

10. A system for measuring pressure comprising:
    a pressure sensing pad having a layer with a two-dimensional pressure sensing area and an optical fiber attached to and traversing the pressure sensing areas; and
    an interferometric-based fiber optic interrogation and processing system coupled to one end of the optical fiber and configured to detect and process reflected light from the optical fiber to determine a pressure associated with the two-dimensional pressure sensing area,
    wherein the optical fiber is a distributed optic strain sensor configured to provide strain information at multiple different points along a length of the optical fiber.

11. The system in claim 10, wherein the interferometric-based fiber optic interrogation and processing system is configured to determine a two-dimensional pressure map associated with the two-dimensional pressure sensing area based on the reflected light.

12. The system in claim 11, wherein the interferometric-based fiber optic interrogation and processing system is configured to convert the strain information into the two-dimensional pressure map.

13. The system in claim 10, wherein a particular configuration of the optical fiber includes at least a serpentine portion.

14. The system in claim 10, wherein a material of the layer has a desired elastic modulus range.

15. The system in claim 10, wherein a material of the layer reduces friction.

16. The system in claim 10, wherein a surface of the layer has a coating applied thereto that reduces friction.

17. The system in claim 10, wherein the pressure sensing pad is configured to measure bending strain by including the optical fiber in the pressure sensing pad offset from a central plane of the pressure sensing pad.

18. The system in claim 10, wherein when a localized strain is imparted at a specific location of the layer, the interferometric-based fiber optic interrogation and processing system is configured to correlate a distance along the length of the optical fiber to a position on the layer.

* * * * *